United States Patent
Kososki (12) 
(10) Patent No.: US 12,406,222 B1
(45) Date of Patent: Sep. 2, 2025

(54) SYSTEM AND METHOD FOR PROVIDING PROXIMITY-BASED DELIVERY SERVICE

(71) Applicant: Travis Kososki, Chapel Hill, NC (US)

(72) Inventor: Travis Kososki, Chapel Hill, NC (US)

(*) Notice: Subject to any disclaimer, the term of this patent is extended or adjusted under 35 U.S.C. 154(b) by 0 days.

(21) Appl. No.: 18/947,607

(22) Filed: Nov. 14, 2024

Related U.S. Application Data (60) Provisional application No. 63/635,255, filed on Apr. 17, 2024.

(51) Int. Cl.
  *G06Q 10/0833* (2023.01)
  *H04L 51/04* (2022.01)

(52) U.S. Cl.
  CPC ......... *G06Q 10/0833* (2013.01); *H04L 51/04* (2013.01)

(58) Field of Classification Search
  CPC ........................... G06Q 10/08; G06Q 10/0833
  See application file for complete search history.

(56) References Cited

U.S. PATENT DOCUMENTS

| | | | |
|---|---|---|---|
| 12,159,256 B1* | 12/2024 | Zeng | G06T 19/006 |
| 2012/0030133 A1* | 2/2012 | Rademaker | G06Q 10/08 |
| | | | 705/333 |
| 2015/0186869 A1* | 7/2015 | Winters | G06Q 20/322 |
| | | | 705/26.81 |
| 2021/0191701 A1* | 6/2021 | Korzunov | G06F 11/302 |

OTHER PUBLICATIONS

Reed, Sara, Ann Melissa Campbell, and Barrett W. Thomas. "The value of autonomous vehicles for last-mile deliveries in urban environments." Management Science 68.1 (2022): 280-299. (Year: 2022).*

* cited by examiner

*Primary Examiner* — Scott M Tungate
(74) *Attorney, Agent, or Firm* — Bridgeway IP Law Group, PLLC; Sang Ho Lee; Hyun Woo Shin (57) ABSTRACT

A method of providing proximity-based delivery service comprises generating, by one or more processors, a neighborhood boundary; generating, by the one or more processors, a delivery service route within the neighborhood boundary; and generating, by the one or more processors, a notification on a user terminal located within the neighborhood boundary when a geolocation of a delivery service vehicle is within a predetermined distance from a geolocation of the user terminal.

10 Claims, 10 Drawing Sheets

Register to be notified
when an truck is in your area

☐ I agree to receive promotional messages sent via autodialer, this agreement isn't condition of any purchase. I also agree to the Privacy Policy.

Sign me up

SYSTEM AND METHOD FOR PROVIDING PROXIMITY-BASED DELIVERY SERVICE

CROSS-REFERENCE TO RELATED APPLICATION

This application claims the benefit of U.S. Provisional Patent Application No. 63/635,255, filed on Apr. 17, 2024, which is hereby incorporated by reference in its entirety.

FIELD OF THE DISCLOSURE

The present disclosure relates to a method and system for providing proximity-based delivery service.

BACKGROUND ART

Delivery services play a crucial role in today's fast-paced world, connecting consumers with goods and services efficiently. Whether it's food delivery, package shipping, or last-mile logistics, the demand for reliable and streamlined delivery services continues to grow.

In recent years, technological advancements have transformed the delivery industry. Mobile applications and GPS tracking have revolutionized how consumers interact with delivery services. From e-commerce giants to local businesses, everyone seeks innovative ways to enhance delivery speed, accuracy, and customer satisfaction.

However, traditional delivery service platforms require users to place an order and wait until an independent contractor vehicle receives the order, drives to a restaurant, picks up the order, and delivers the services or goods to the customers. This process is time and energy consuming.

This inefficient process of the traditional delivery service platforms is due to the fact that the traditional delivery service cannot know in advance what goods and services will be purchased or ordered by the users of the traditional platforms.

This application aims to provide solutions to these challenges by providing a proximity-based delivery service method and system.

ADVANTAGEOUS EFFECTS

By providing a proximity notification when a geolocation of a delivery service vehicle comes within a predetermined distance from a geolocation of a user terminal, the proximity-based delivery service can forego inefficient process of placing an order by the user terminal, waiting until a delivery service vehicle receives the order, and driving by the delivery service vehicle to a vendor to pick up the order, because the delivery service vehicle already contains goods or services to be delivered when the proximity notification is sent out to users.

By generating a proximity notification enabling the user terminal to request a stop of the delivery service vehicle at the geolocation of the user terminal only when the delivery service vehicle comes within the predetermined distance, the deliver service vehicle may deliver the goods or services in short distance, increasing delivery efficiency.

By generating a countdown timer outputting a time window during which to complete a transaction when the delivery service vehicle comes within another predetermined distance from the user terminal, the delivery service vehicle may increase delivery efficiency by limiting time spent per user who requests a stop of the delivery service vehicle.

By extracting users based on a plurality of logical extracting rules, users who have user information that match information of a predetermined product or service can be identified in advance. The extracted users may be used for a targeted delivery of the predetermined product or service. By the targeted delivery, the system or method of the present disclosure can forego inefficient process of placing an order by the user terminal, waiting until a delivery service vehicle receives the order, and driving by the delivery service vehicle to a vendor to pick up the order.

By automatically generating the neighborhood boundary encompassing the group of users when a memory allocation for the group of users within a predetermined area exceeds a predetermined threshold, the system or the method of the present disclosure can target-deliver to only the area that have a high user engagement level.

By analyzing memory allocation reflecting user engagement history of at least one user and automatically generating a delivery service route passing at least one geolocation of the at least one user whose memory allocation exceeds a predetermined threshold, the method or system of the present disclosure can target-deliver to only the users who have high likelihood of requesting a stop of the delivery service vehicle, thereby increasing delivery efficiency.

By analyzing memory allocation reflecting a current user traffic of at least one user within the neighborhood boundary and automatically generating a delivery service route passing the at least one user who has the memory allocation that exceeds a predetermined threshold, the method or system of the present disclosure can target-deliver to only the users who have high likelihood of requesting a stop of the delivery service vehicle, thereby increasing delivery efficiency.

By generating a message in a chatroom of the neighborhood boundary notifying a scheduled delivery service within the neighborhood boundary, analyzing memory allocation that reflects user engagement level in response to the message in the chatroom, and determining whether the memory allocation in the chatroom exceeds a predetermined threshold, the system or method of the present disclosure can target-dispatch the delivery service vehicle only to the neighborhood boundary that has a high likelihood of engaging the delivery service vehicle.

The effects according to the instant disclosure are not limited by the contents exemplified above, and various other effects are included in the present specification.

SUMMARY OF THE DISCLOSURE

The method according to the present disclosure to achieve the object described above includes: generating, by one or more processors, a neighborhood boundary; generating, by the one or more processors, a delivery service route within the neighborhood boundary; and generating, by the one or more processors, a notification on a user terminal located within the neighborhood boundary when a geolocation of a delivery service vehicle is within a predetermined distance from a geolocation of the user terminal.

According to one embodiment of the present disclosure, the predetermined distance includes a first predetermined distance and a second predetermined distance, and the first predetermined distance is 1 km radius or less and the second predetermined distance is 100 m radius or less.

According to another embodiment of the present disclosure, the generating of the notification on the user terminal includes: generating a proximity notification on the user terminal when the geolocation of the delivery service vehicle comes within the first predetermined distance from the geolocation of the user terminal, the proximity notification enabling the user terminal to request a stop of the delivery service vehicle at the geolocation of the user terminal; or generating a countdown timer on the user terminal when the geolocation of the delivery service vehicle comes within the second predetermined distance from the geolocation of the user terminal.

According to another embodiment of the present disclosure, the method includes: prior to the generating the neighborhood boundary, collecting user information from at least one user terminal; and extracting a group of users, based on the user information, according to a plurality of logical extracting rules, wherein the plurality of logical extracting rules includes extracting, from the user information, information that match information of a predetermined product or service for delivery and extracting the group of users that have the information that match the information of the predetermined product or service.

According to another embodiment of the present disclosure, the generating the neighborhood boundary is performed automatically, by the one or more processors, according to a plurality of boundary generating rules, and the plurality of boundary generating rules includes generating the neighborhood boundary encompassing the group of users, when a memory allocation by the one or more processors for the group of users within a predetermined area exceeds a predetermined threshold.

According to another embodiment of the present disclosure, the generating the neighborhood boundary is performed manually by a cursor motion on a manager terminal that outputs a digital map and the group of users extracted according to the plurality of logical extracting rules on the digital map.

According to another embodiment of the present disclosure, the delivery service route is generated according to a plurality of route generating rules, and the plurality of route generating rules include analyzing memory allocation by the one or more processors reflecting user engagement history of at least one user and generating a delivery service route passing at least one geolocation of the at least one user whose memory allocation by the one or more processors exceeds a predetermined threshold.

According to another embodiment of the present disclosure, the delivery service route is generated according to a plurality of route generating rules, and the plurality of route generating rules include analyzing memory allocation by the one or more processors reflecting a current user traffic of at least one user within the neighborhood boundary and generating a delivery service route passing the at least one user who has the memory allocation that exceeds a predetermined threshold.

According to another embodiment of the present disclosure, the generating the neighborhood boundary includes: generating automatically, by the one or more processors, a chatroom for communication between a driver of the delivery service vehicle, a manager of a manager terminal, and at least one user of at least one user terminal located within the neighborhood boundary.

According to another embodiment of the present disclosure, the method includes: after the generating the neighborhood boundary, generating a message in the chatroom notifying a scheduled delivery service of the delivery service vehicle within the neighborhood boundary; analyzing, by the one or more processors, memory allocation that reflects user engagement level in response to the message in the chatroom; determining whether the memory allocation in the chatroom exceeds a predetermined threshold by the one or more processors; and dispatching the delivery service vehicle to the neighborhood boundary when the memory allocation exceeds the predetermined threshold.

According to another embodiment of the present disclosure, the generating the delivery service route includes: outputting, by the one or more processors, on a first user terminal, a digital map of the neighborhood boundary encompassing the delivery service route and a geolocation of a second user terminal, requesting, by the first user terminal, a stop of the delivery service vehicle at the geolocation of the second user terminal.

According to another embodiment of the present disclosure, the method comprising: generating, by one or more processors, a neighborhood boundary; generating, by the one or more processors, a delivery service route within the neighborhood boundary; and generating, by the one or more processors, a notification on a user terminal located within the neighborhood boundary when a geolocation of a delivery service vehicle is within a predetermined distance from a geolocation of the user terminal, wherein the predetermined distance includes a first predetermined distance and a second predetermined distance, wherein the first predetermined distance is 1 km radius or less and the second predetermined distance is 100 m radius or less, wherein the generating of the notification on the user terminal includes: generating a proximity notification on the user terminal when the geolocation of the delivery service vehicle comes within the first predetermined distance from the geolocation of the user terminal, the proximity notification enabling the user terminal to request a stop of the delivery service vehicle at the geolocation of the user terminal; or generating a countdown timer on the user terminal when the geolocation of the delivery service vehicle comes within the second predetermined distance from the geolocation of the user terminal, wherein the delivery service route is generated according to a plurality of route generating rules, and wherein the plurality of route generating rules include analyzing memory allocation by the one or more processors reflecting user engagement history of at least one user and generating a delivery service route passing at least one geolocation of the at least one user whose memory allocation by the one or more processors exceeds a predetermined threshold.

According to another embodiment of the present disclosure, a system for providing proximity-based delivery service includes: one or more processors; and one or more non-transitory computer-readable media storing instructions executable by the one or more processors, the instructions to perform: generating, by one or more processors, a neighborhood boundary; generating, by the one or more processors, a delivery service route within the neighborhood boundary; and generating, by the one or more processors, a notification on a user terminal located within the neighborhood boundary when a geolocation of a delivery service vehicle is within a predetermined distance from a geolocation of the user terminal.

DESCRIPTION OF DRAWINGS

The above and other aspects, features and other advantages of the instant disclosure will be more clearly understood from the following detailed description taken in conjunction with the accompanying drawings, in which.

DETAILED DESCRIPTION

In the present disclosure, where certain known functions are deemed obvious to those skilled in the art and may unnecessarily obscure the subject matter, detailed descriptions of such functions are omitted. The terminology used herein is for the purpose of describing particular embodiments and is not intended to limit the scope of the disclosure. Singular forms include plural forms unless the context clearly dictates otherwise. As used herein, the terms "comprise" or "have" specify the inclusion of stated features, steps, or components but do not exclude the presence or addition of other features, steps, components, or combinations thereof.

The advantages, features, and methods of the present disclosure will be more readily apparent from the following detailed description of exemplary embodiments and the accompanying drawings. However, it should be understood that the scope of the disclosure is not limited to these embodiments, and the disclosure may be implemented in various other forms. The embodiments described are provided to enable those skilled in the art to understand the full scope of the disclosure, which is defined solely by the appended claims.

The processes and operations described herein may be performed in different sequences or simultaneously in various embodiments, as would be understood by those skilled in the art. Embodiments of the present disclosure may involve computing devices, including processing and memory resources, and may be implemented on devices such as servers, desktop computers, smartphones, tablets, or other electronic devices. These embodiments may be executed by one or more processors and may be stored on a non-transitory computer-readable medium, such as a hard drive, flash memory, or optical disc. The machines illustrated in the figures may include processors and memory configured to execute instructions. Examples of non-transitory computer-readable storage media also include portable storage devices, such as flash drives and magnetic storage devices. Additionally, embodiments may be implemented as computer programs or on a computer-usable carrier medium capable of carrying such programs.

Hereinafter, the term "software" or "application" is defined herein as having its broadest definition to ordinary skill in the art to refer to software including instructions executable in a non-transitory computer-readable medium that would perform the associated function when executed, a circuit or a processor designed to perform the associated function, hardware designed to perform the associated function, or a combination of them. Hereinafter "software" and "application" will be used interchangeably.

Although ice cream delivery service will be described as examples of the proximity-based delivery service, it is not limited thereto. The system can facilitate other proximity-based services, such as food truck services, or entertainment services, connecting individuals with relevant service providers.

Figure 1:
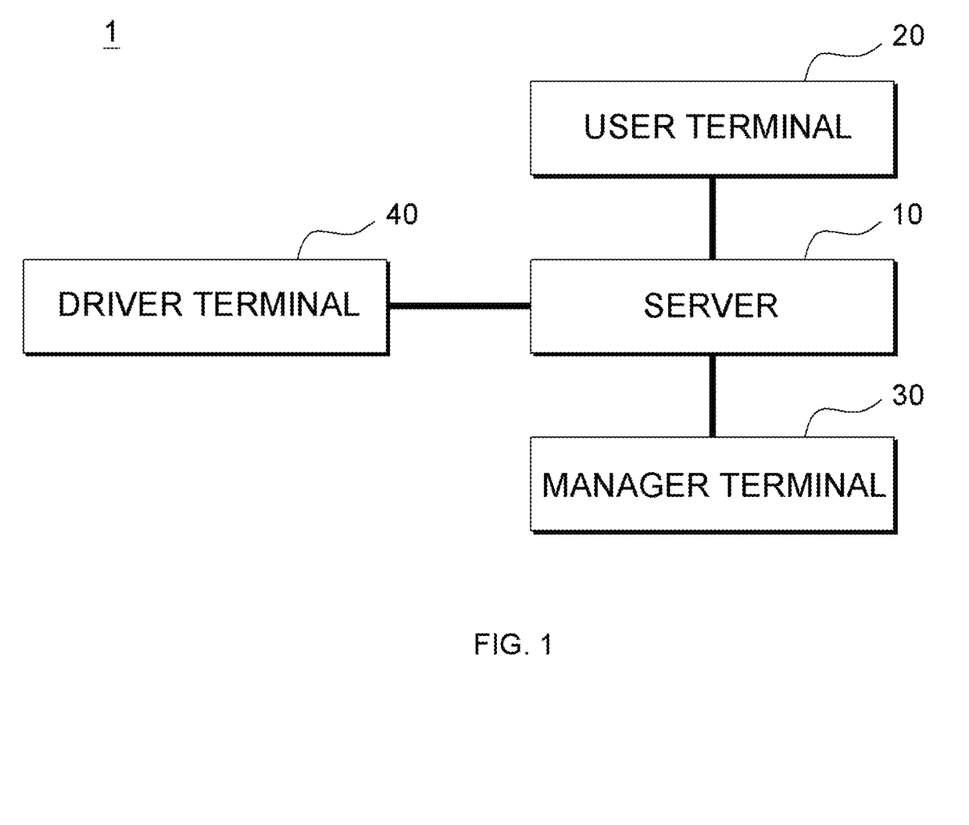
FIG. 1 is a configuration diagram of a system for providing proximity-based delivery service according to one embodiment of the instant disclosure.

FIG. 1 illustrates a configuration of the system 1 according to one embodiment of the present disclosure. The system 1 may include a server 10, user terminal 20, manager terminal 30, and driver terminal 40. Each of the server 10, user terminal 20, manager terminal 30, and driver terminal 40 may include one or more processors and non-transitory computer-readable storage media. Servers 10 may include any kind of server including Amazon Web Services (AWS). For the purposes of this discussion, a user terminal 20, a driver terminal 40, and/or a manager terminal 30 refer to devices such as cellular phones, smartphones, personal digital assistants (PDAs), laptops, and tablets, which are equipped with network connectivity and processing capabilities to communicate with the system via a network. A driver terminal may also include on-board vehicle computers or customized hardware. Both the user terminal 20 and the driver terminal 40 may run a designated service application designed to interact with the delivery service system 1.

The components 10, 20, 30, 40 of the system 1 may communicate through a wired/wireless network that is a connection structure in which information may be transmitted or received between nodes such as a terminal and a server, and examples of such a network may include the Internet, a local area network (LAN), a wireless local area network (wireless LAN), a wide area network (WAN), a personal area network (PAN), 3G, 4G, 5G, wireless fidelity (Wi-Fi), Bluetooth, near-field communication (NFC), radio frequency identification (RFID), a home network, etc., but are not limited thereto. How the components of the system 1 operate in interaction with one another will also be described in detail below with reference to FIG. 2.

Figure 2:
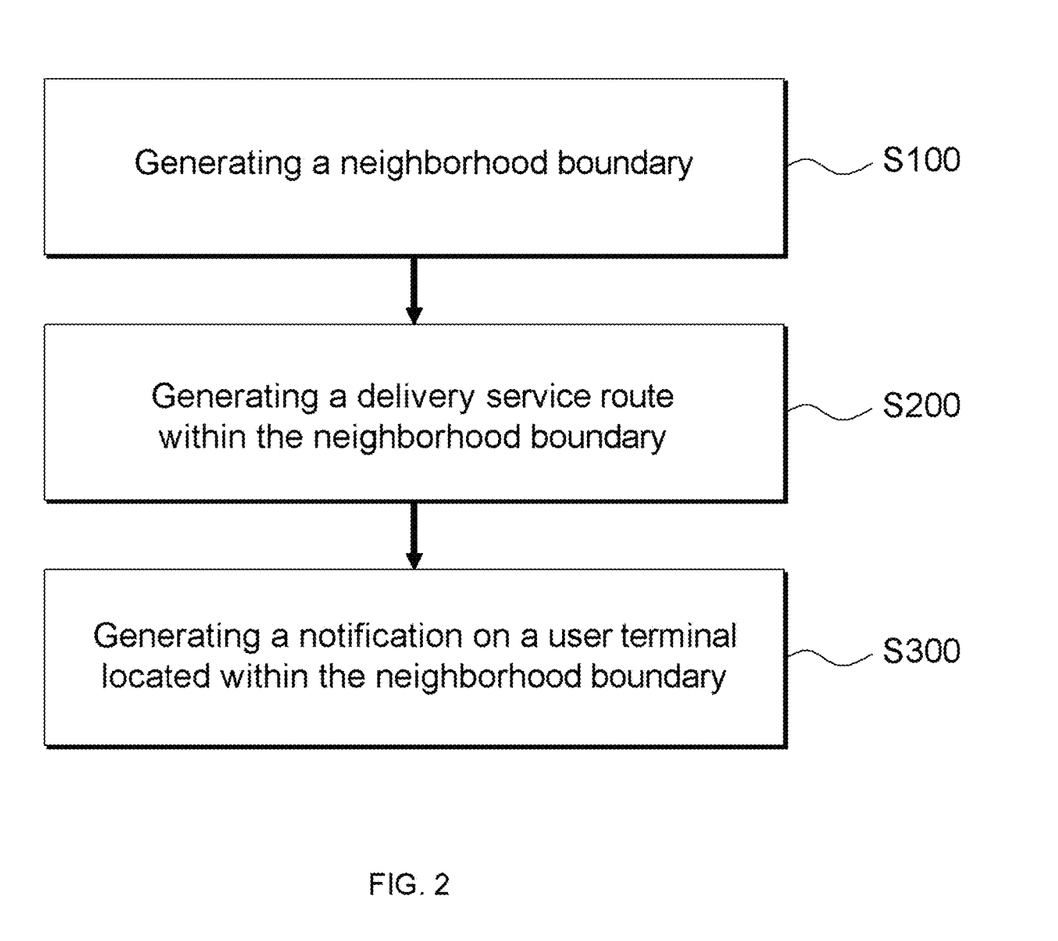
FIG. 2 is a flowchart illustrating a method for providing a proximity-based delivery service according to one embodiment of the instant disclosure.

FIG. 2 is a flowchart illustrating a method for providing a proximity-based delivery service, in accordance with one embodiment of the present disclosure. Hereinafter, the method for providing the proximity-based delivery service, as shown and described in connection with FIG. 1, will be explained in further detail with reference to this figure.

Figures 3A, 3B, 3C:
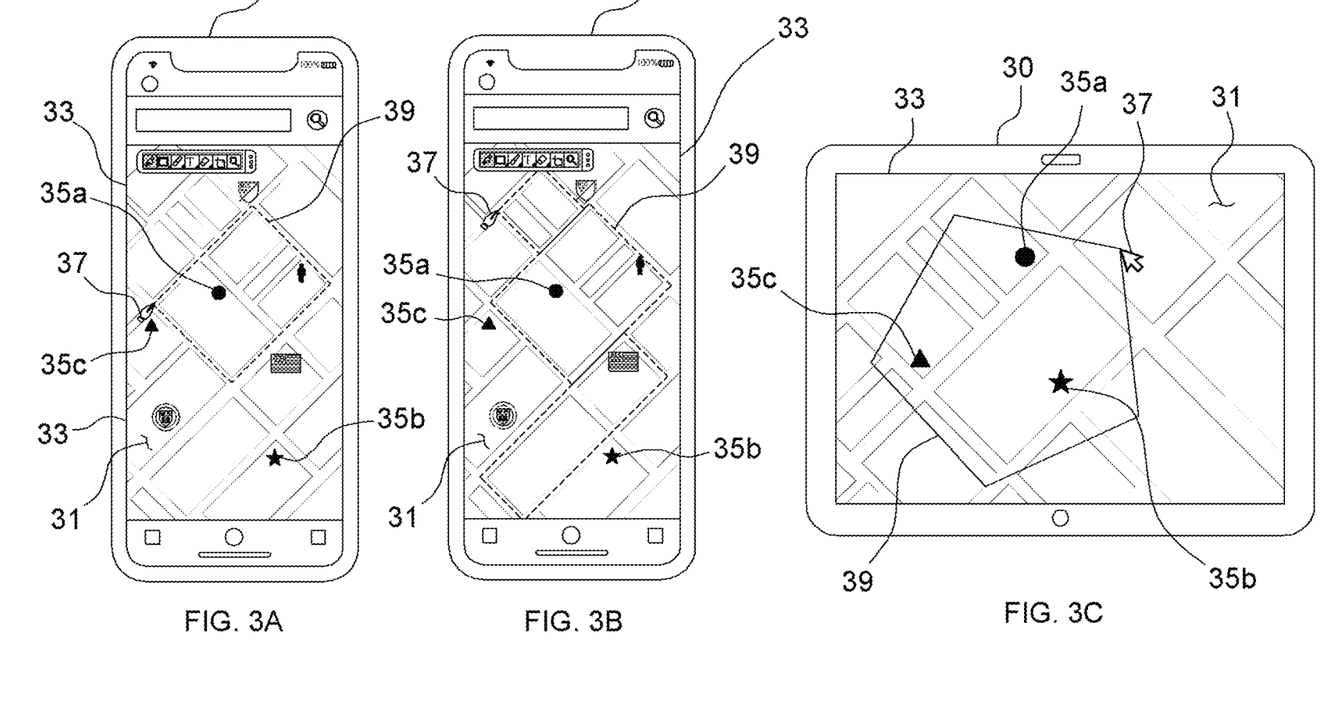
FIGS. 3A, 3B, and 3C are examples of generating the neighborhood boundary according to one embodiment of the instant disclosure.

First, in a step of generating a neighborhood boundary S100, a manager using the manager terminal 30 may generate a neighborhood boundary 39 on the manager terminal 30. Here, the manager terminal 30 may output a map 31 on a display 33 of the manager terminal 30, as seen in FIG. 3 of the present disclosure. The map 31 may output geolocations 35a, 35b, 35c of users of the proximity-based delivery service. The manager using the manager terminal 30 may draw a boundary on the map 31 by a drawing means 37 provided on the map 31. For example, the manager may draw the neighborhood boundary 39 on the map 31 by dragging the mouse cursor 37.

The neighborhood boundary 39 may take any shape. For example, the neighborhood boundary 39 may take a polygonal shape, such as a star, sphere, cone, cylinder, rectangle, pentagon, hexagon, and octagon, and so forth.

Figure 4:
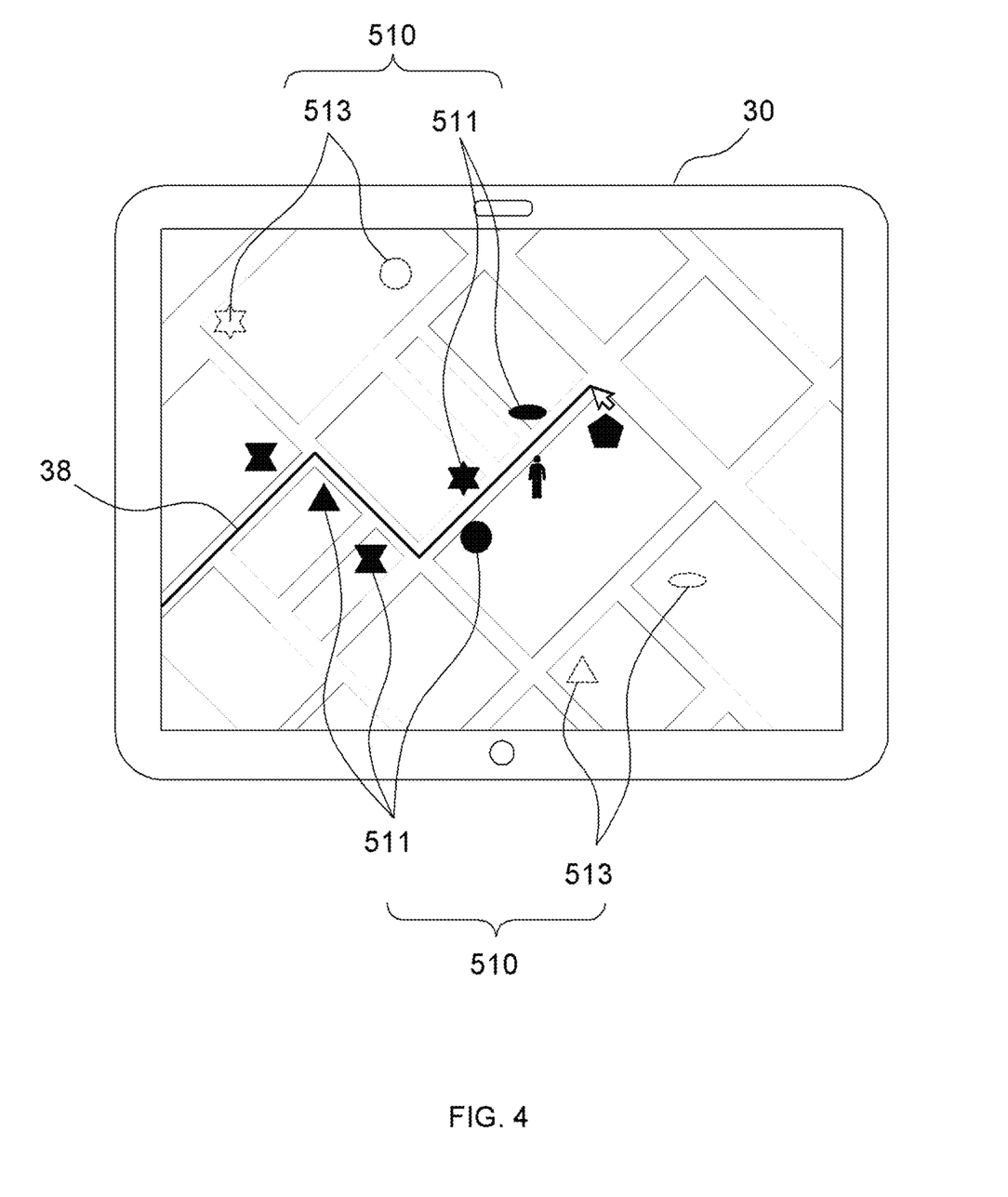
FIG. 4 is an illustration of generating a delivery service route according to one embodiment of the instant disclosure.

Second, in a step of generating a delivery service route within the neighborhood boundary S200, the manager may generate a delivery service route 38 within the neighborhood boundary 39 using the manager terminal 30, as seen in FIG. 4. Here, the manager may manually generate the delivery service route 38, for example, by dragging the cursor 37 or clicking the cursor to a desired point.

Until now, although the step S100 and the step S200 are described as being performed by the manager terminal 30, the present disclosure is not limited thereto, and other devices or terminals, such as the server 10, the user terminal 20, and the driver terminal 40 may perform the steps S100, S200.

Figure 5A:
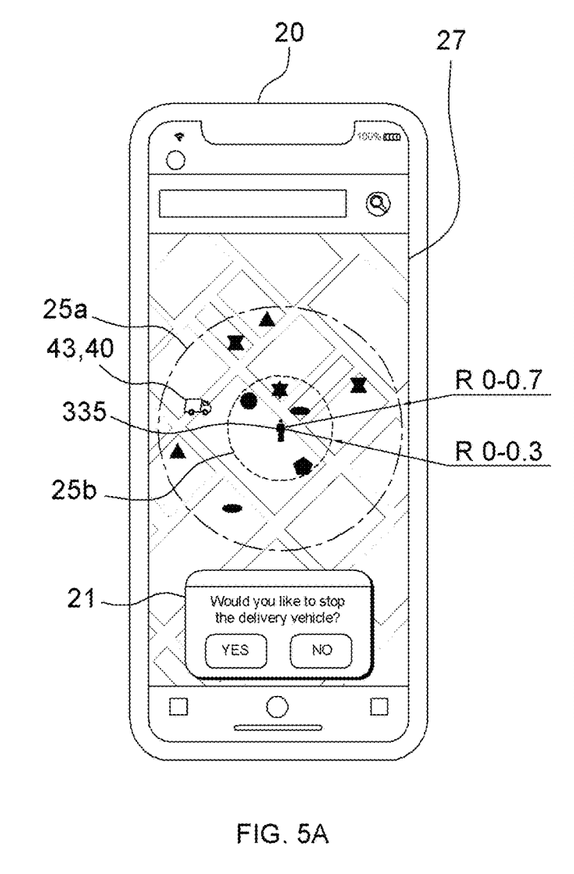
FIG. 5A shows a predetermined distance from the user terminal including the first predetermined distance and the second predetermined distance according to one embodiment of the instant disclosure.
Figure 5B:
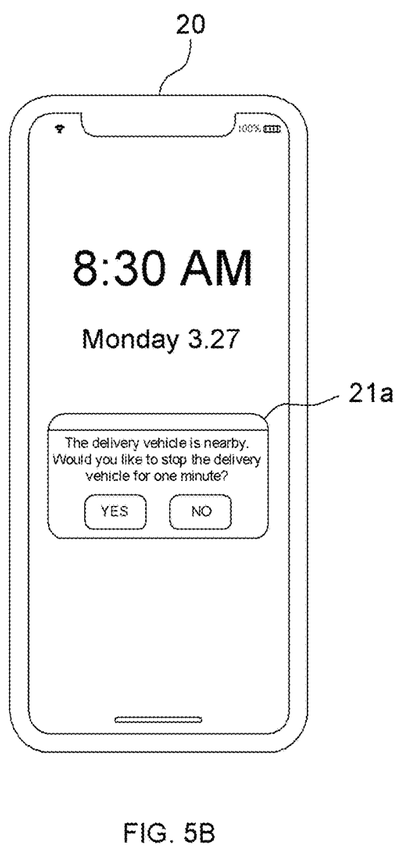
FIG. 5B shows an example of the user terminal outputting the proximity notification according to one embodiment of the instant disclosure.

In a step of generating a notification on a user terminal located within the neighborhood boundary S300, the user terminal 20 may generate a notification 21 on the user terminal 20 located within the neighborhood boundary, when a geolocation 43 of a delivery service vehicle including the driver terminal 40 is within a predetermined distance 25 from a geolocation 23 of the user terminal 20, as seen in FIGS. 5A and 5B.

FIG. 5A shows that the predetermined distance 25 may include a first predetermined distance 25a and a second predetermined distance 25b. A display 27 of the user terminal 20 may output a map showing the first predetermined distance 25a and the second predetermined distance 25b as circles. Each of the circles may have a radius that is equal to the first predetermined distance 25a or the second predetermined distance 25b. The circles of the first predetermined distance 25a and the second predetermined distance 25b may have different colors from each other. For example, the first predetermined distance 25a may be in a blue circle, and the second predetermined distance may be in a pink circle, but the present disclosure is not limited thereto.

Here, the first predetermined distance may be in a radius range of 1 kilometer (km) or less, or more preferably 0.7 km or less, or most preferably, 0.5 km or less. Also, the second predetermined distance may be in a radius range of 300 meter (m) or less, or more preferably 200 m or less, or most preferably 100 m or less.

FIG. 5A or 5B shows that the user terminal 20 may generate a proximity notification 21a on the user terminal 20 when the geolocation 43 of the delivery service vehicle comes within the first predetermined distance 25a from the geolocation 23 of the user terminal. Here, the proximity notification 21a may enable the user terminal to request a stop of the delivery service vehicle at the geolocation 23 of the user terminal 20. The proximity notification 21a may be output on the map on the display 27 showing the first predetermined distance 25a and the second predetermined distance 25b when the application or software for the proximity-based delivery service is being run on the user terminal 20, as seen in FIG. 5A, or may be output on the display 27 of the user terminal even when the application or the software is not running on the user terminal 20, as seen in FIG. 5B.

Figure 6:
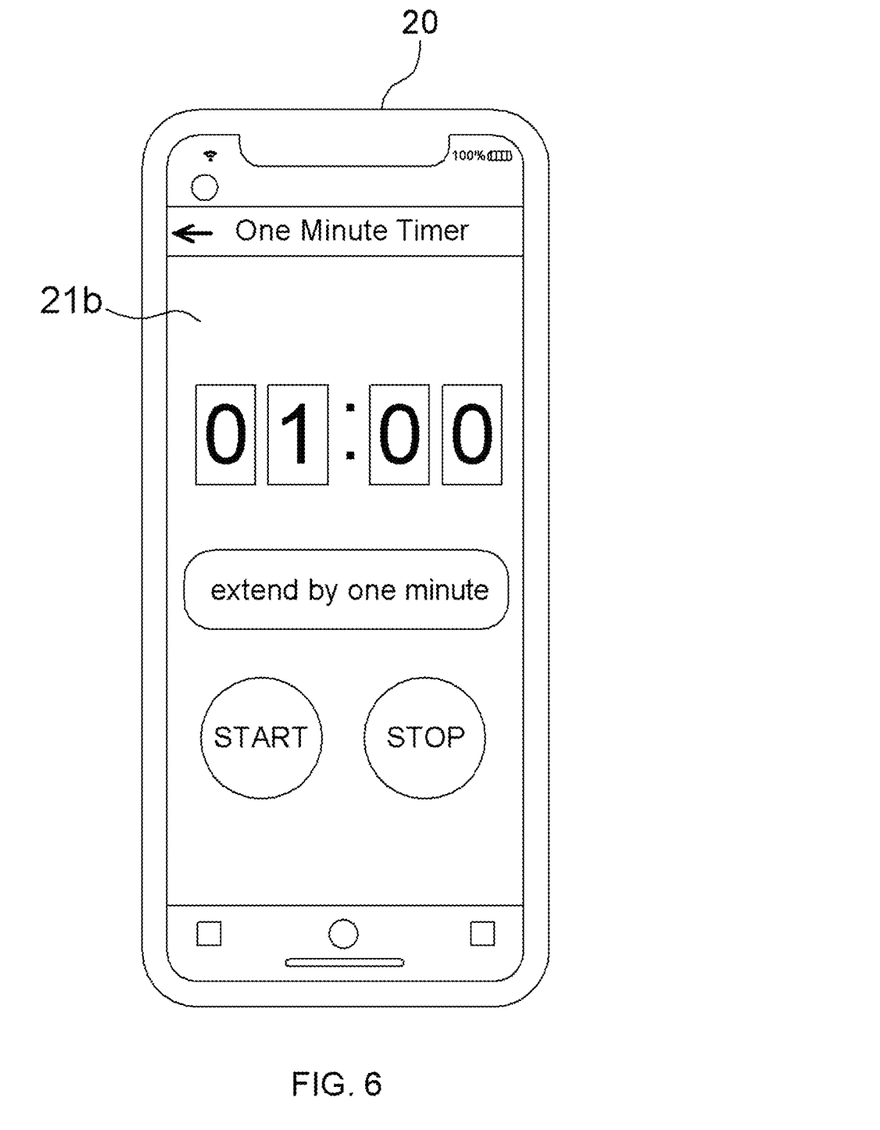
FIG. 6 shows an example of the user terminal outputting the countdown timer according to one embodiment of the instant disclosure.

FIG. 6 shows that, once the user terminal requests the stop through the proximity notification 21a, the user terminal 20 may generate a countdown timer 21b on the user terminal 20 when the geolocation 43 of the delivery service vehicle comes within the second predetermined distance 25b from the geolocation 23 of the user terminal 20. The countdown timer 21b may output a remaining time during which the user of the user terminal 20 may finish a transaction for the delivery service. The remaining time may also be a time period during which the delivery service vehicle of the driver terminal 40 may stop at the geolocation 23 of the user terminal 20. The time period may be in a range of 3 minutes or less, or more preferably 2 minutes or less, or most preferably 1 minute or less.

However, the countdown time may be extended indefinitely, but it is preferable that the extension is limited to five minutes, so that the service may be provided to other users in the neighborhood efficiently. If the user chooses to extend the countdown time, the extension information will be transmitted to the server 10 by the user terminal 20, and in turn, the server will transmit the extension information to the driver terminal.

Although the user terminal 20 is described as generating the notification 21 on the user terminal in step 300, the present disclosure is not limited thereto, and other devices or terminals, such as the server 10, the manager terminal 30, and the driver terminal 40 may perform the step S300.

Figure 7:
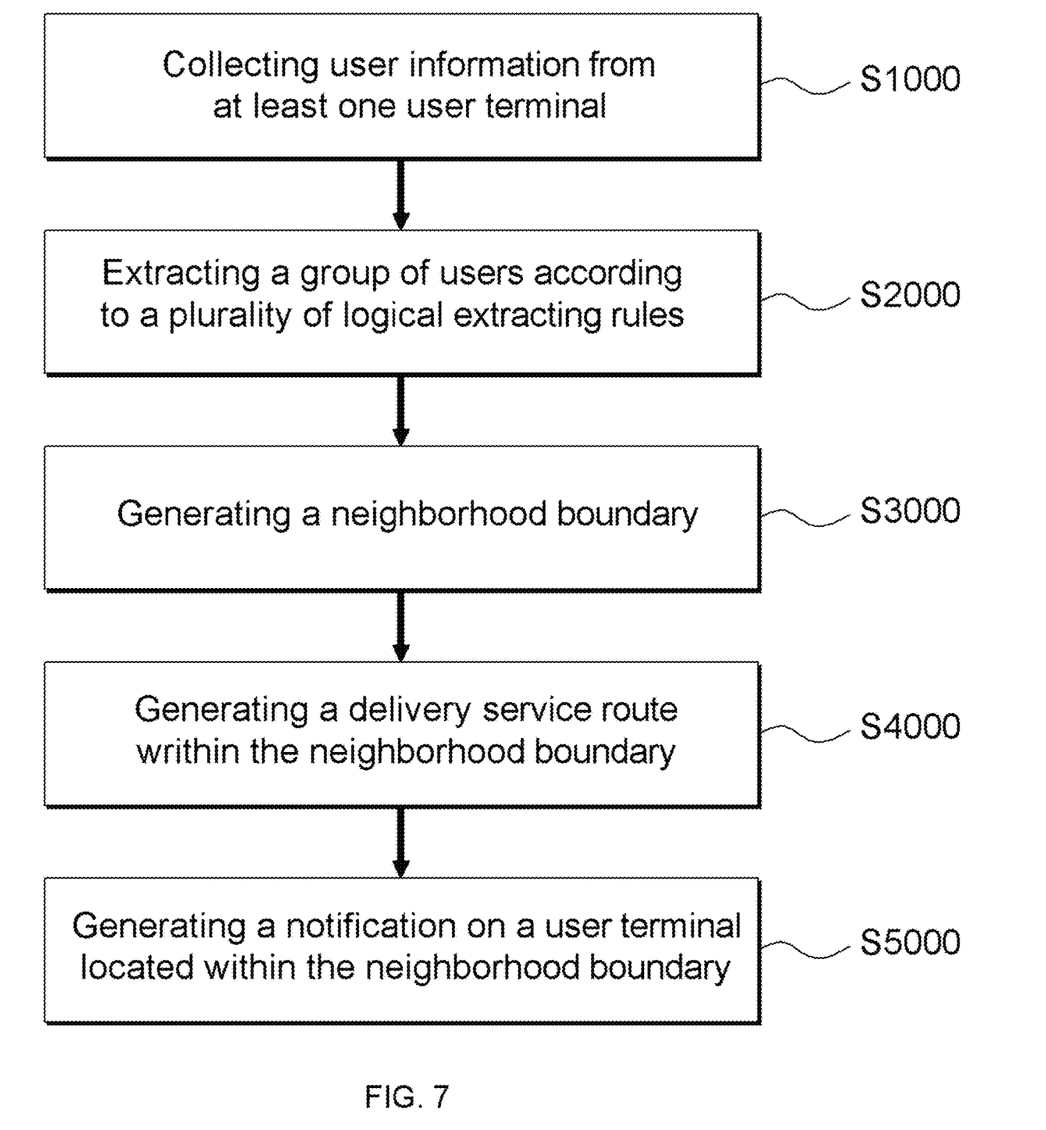
FIG. 7 is a flowchart illustrating a method for providing a proximity-based delivery service according to one embodiment of the instant disclosure.

FIG. 7 shows a flowchart for another embodiment of the present disclosure. Descriptions for steps S3000, S4000, S5000 of FIG. 7, which are already addressed in steps S100, S200, S300 with regards to FIG. 2, are omitted to avoid redundancy.

Here, because the delivery service application already has the user information of the users located in the neighborhood boundary, the delivery service vehicle may pre-store goods and services that are expected to be in high demand in the neighborhood boundary, removing the inefficient process of receiving orders from the users and picking up goods and services from restaurants or stores, thereby maximizing profit.

Figure 8A:
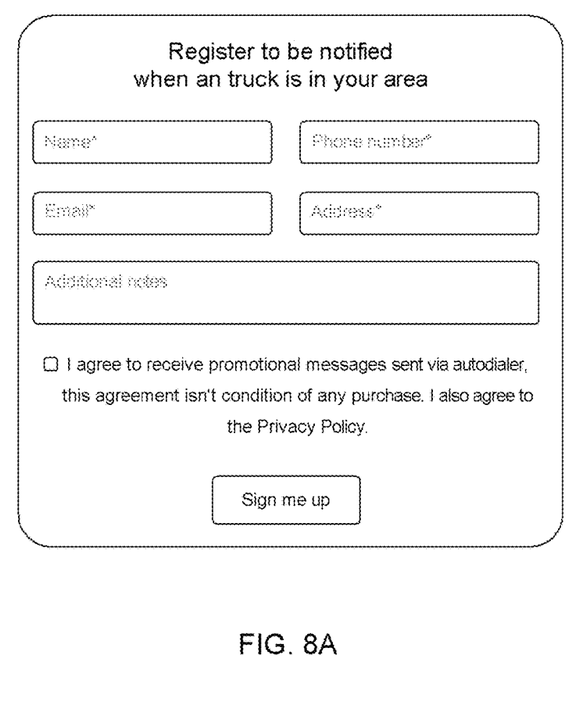
FIGS. 8A and 8B show examples of information inputting step S1000 according to one embodiment of the instant disclosure.

In a step S1000 of collecting user information from at least one user terminal, each user may input his or her information in an application for the proximity-based delivery service downloaded and installed in the user terminal 20. FIG. 8A shows an example of a page output on the user terminal 20 enabling a user to input the user information.

Here, a user is someone who operates the application that is installed on the user terminal 20 providing the proximity-based delivery service, and may be defined as a resident living in a particular neighborhood area. For example, a user may be a resident of Oakton, Virginia. Anyone with access to a user terminal 20 can be a user for the purposes of the present disclosure.

When executing the application installed on the user terminal 20, each user may use the proximity-based delivery service by logging in after completing a procedure for subscription and signing up. The user may use the user terminal 20 to perform a subscription or sign-up procedure and the information input through the user terminal 20 for the membership subscription and signing up will be transmitted to the server 10. Here, during the signing up process, various types of information input through the user terminal will be stored in the server 10 or the manager terminal 30. The user information may updated anytime in the server 10. Any information input by the user may be referred to as user information.

Figure 8B:
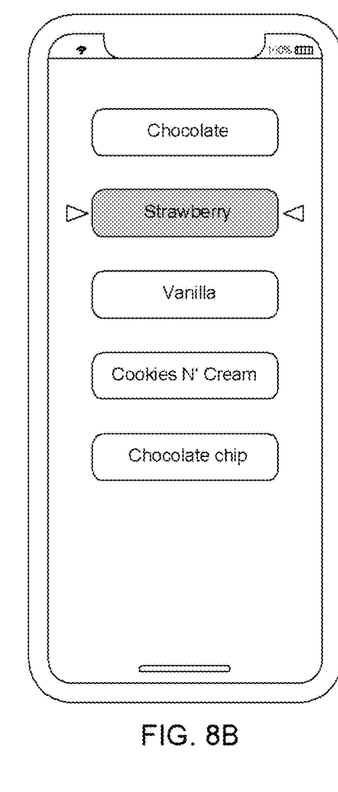

As seen in FIGS. 8B, the user information may include product information of a product in which a user is interested in purchasing. The product information may be any product information, such as favorite ice cream flavor, clothing brands, cars, smartphones, appliances, video games, and so forth. Although not shown in FIG. 8B, the user information may also include service information of a service in which a user is interested in receiving. The service information includes, for example, mechanic services, car cleaning services, consulting services, legal services, financial advisory services, home cleaning services, IT support, and so forth.

The user information may also include user personal information. The user personal information may include any information regarding the user, such as profession, alma mater, political views, religion, hometown, favorite musician, favorite art, favorite movie, age, and so forth. The server can use this user information as factors in defining a neighborhood boundary, which will be described below in more detail. The server 10, the manager terminal 30, and/or the driver terminal 40 may store the user information.

The stored user information may also include user engagement history including purchase history. This purchase history encompasses details such as specific time at which the user purchased the goods or services, types of the goods or services, cumulative nutritional information, dietary choices (e.g., vegan or vegetarian), specific flavors of ice cream, and other relevant data. One or more processors of the server 10, manager terminal 30, and/or driver terminal 40 may allocate memory for each stored user engagement history information.

With regards to the user engagement history, if one user has a history of making 100 purchases from the delivery service vehicle, the server 10 may allocate memory corresponding to the 100 purchases. Therefore, if a user who has made 3000 purchases will have higher memory allocation by the server 10 than another user having made only 300 purchases. The server 10, manager terminal 30, or the driver terminal may utilize this memory allocation information to generate routes for delivery, which will be described later in the disclosure.

In the step S1000, the user may also input their ID, password, and other relevant details, which are then stored along with the user information on the server. Additionally, the server may store each user's payment information. The application installed on the user's terminal may also store user-selected payment options, such as wire transfer, Zelle, Venmo, PayPal, credit card, debit card, and other online transaction methods, on the server.

The user information may also include basic user information. The basic user information is information used in identifying a user who operates the user terminal, and may mainly include an address, contact information, mobile phone number, information on driver's license, e-mail address or a social network service (SNS) account (See FIG. 8B). The user may subscribe to the service with only the e-mail address or SNS account. For the present disclosure, it is preferable that the basic user information includes user's residence address, because this address information may be used for effecting a delivery when the GPS information of a user terminal is unavailable.

The user terminal 20 may receive an authentication result from the manager terminal 30 and/or the server 10. The manager terminal 30 or the server 10 may authenticate or reject the user terminal through the basic user information. For example, the manager terminal 30 and/or the server 10 may determine whether the e-mail address included in the basic user information is valid (whether it is an e-mail for the purchaser of the user terminal) and, if valid, approve the subscription for the membership of the user, and if not valid, reject the subscription for the membership of the user.

The authentication result may also confirm the current geolocation or residence of the user. For this, the server 10 may determine the geolocation of the users. For instance, the user terminals 20 may report their current geolocation to the server based on information from one or more on-board sensors, such as based on GPS information from a GPS device and/or other location indicative information, such as nearby cell towers, wireless connection points, and the like. Accordingly, based at least in part on the geolocation information received from the user terminals 20, the server may determine respective indicated geolocations of the user terminals 20. The server 10 may also store the geolocation information of the users verified based on the GPS information above.

When the subscription is completed, the user using the user terminal 20 may access the application managed by the manager terminal 30, driver terminal 40 and/or server 10. The application may function while the user is using the application (e.g. the application running on the display of the user terminal 20) as well as while the application is turned on in the background of the user terminal 20.

After having completed the step S1000 of collecting user information, a step S2000 of extracting a group of users, based on the user information, according to a plurality of logical extracting rules, can be performed. Here, any of the server 10, user terminal 20, manager terminal 30, and driver terminal 40 may perform this step, but hereinafter, a server 10 will be described as performing this step S2000.

The server 10 may extract a group of users, based on the user information collected in the step 1000, according to a plurality of logical extracting rules. The plurality of logical extracting rules include extracting, from the user information, information that match information of a predetermined product or service for delivery and extracting the group of users that have inputted the information in the step S1000 that match the information of the predetermined product or service. The information of the predetermined product may be a product information of a good or service that the delivery service vehicle intends to deliver to the neighborhood boundary. After identifying the information that match the information of the predetermined product from the user information collected in the step S1000, the plurality of logical extracting rules may extract the group of users that have the information that match the information of the predetermined product or service.

For example, users may input user information that the users' favorite ice cream flavor is strawberry ice cream. Then, the server 10 may identify or extract a group of users whose favorite ice cream flavor is strawberry according to the plurality of logical extracting rules, when the delivery service vehicle intends to deliver strawberry ice creams to the neighborhood boundary.

By having the plurality of logical extracting rules, the system 1 may know in advance which service or good to deliver to a certain neighborhood boundary, foregoing a need to order and pick up the good or service.

Hereinafter, a step S3000 of generating the neighborhood boundary according to a plurality of boundary generating rules will be described. Although the step S3000 is described in conjunction with the steps, the step S3000 may be performed without the previous steps S1000 and S2000.

In the step S3000, the plurality of boundary generating rules include generating the neighborhood boundary encompassing one or more users, when a memory allocation by the one or more processors for the group of users within a predetermined area exceeds a predetermined threshold. Here, the server 10 may predetermine an area having a predetermined radius. The predetermined radius of the specified area may be 10 km or less, 7 km or less, 5 km or less, 3 km or less, or 1 km or less, although the present disclosure is not limited to these values. The center point of the predetermined area may be selected randomly; however, for the purposes of this disclosure, any area in which at least a predetermined number of users are located may serve as the center point. For example, an area where at least 30 users are within a 1 km radius may be automatically selected as the predetermined area.

In an alternative, the server 10 may predetermine an area by administrative district information or zoning information, such as census-designated place, designated by the US Census Bureau. For example, the server 10 may predetermine an area to be the Oakton or Mosby Woods in Fairfax County, Virginia.

The server 10 may analyze whether a memory allocation by the server 10 for the one or more users within the predetermined area exceeds a predetermined threshold. The memory allocation occurs when more users access the application to support new user sessions, process user requests, and handle data storage. The memory allocation also occurs when the server 10 assigns memory for user-specific data (i.e. the user information including user engagement history), such as login credentials, preferences, or ongoing interactions with the application.

For example, when the server 10 predetermines an area in Oakton, Virginia having a predetermined radius of 3 km, the server 10 may analyze whether a memory allocation for users within the predetermined area (i.e. the memory allocated for stored user information of the users within the predetermined area) exceed a predetermined threshold. For example, when the predetermined threshold is an amount of memory that can be allocated for user information of 100 users, the server 10 may automatically generate a neighborhood boundary when the predetermined area has more than 100 users whose user information (i.e. geolocation) is stored in the server 10.

In an alternative embodiment, instead of automatically generating the neighborhood boundary according to the plurality of boundary generating rules, the manager may manually generate a neighborhood boundary by a cursor motion, as described previously with reference to FIG. 2.

Hereinafter a step S4000 of generating a delivery service route according to a plurality of route generating rules will be described. Although the step S4000 is described in conjunction with the steps S1000 S2000 S3000, the present disclosure is not limited thereto.

In the step S4000, the plurality of route generating rules may include evaluating memory allocation reflecting user engagement history. For example, the server 10 stores the user engagement history, such as time of purchase, purchase items or services, a number of times a user requesting a stop of the delivery service vehicle, and so forth.

Here, the plurality of route generating rules may utilize the user engagement history multidimensionally. For example, when a delivery service vehicle delivers a good or service at 4:00 PM on Monday, the server 10 may choose to utilize only the memory allocation for user engagement history reflecting a number of purchases made by users around 4:00 PM. The plurality of route generating rules may evaluate memory allocation for such information of each user—whether or not the memory allocation exceeds a predetermined threshold. Then, the plurality of route generating rules may generate a route passing only the users whose memory allocations reflecting the user engagement history exceeds the predetermined threshold.

In an alternative embodiment, the plurality of route generating rules may include evaluating memory allocation of the one or more processors reflecting a current user traffic within the neighborhood boundary. The current user traffic refers to a volume of data transmitted over a network that is generated by users interacting with the application. The current user traffic may include a variety of current activities of the users such as turning on the application in the background of the user terminal 20, browsing through the application, and so forth. Then, the plurality of route generating rules may generate a delivery service route passing only the users whose memory allocation for the current user traffic within exceeds a predetermined threshold.

Figure 9:
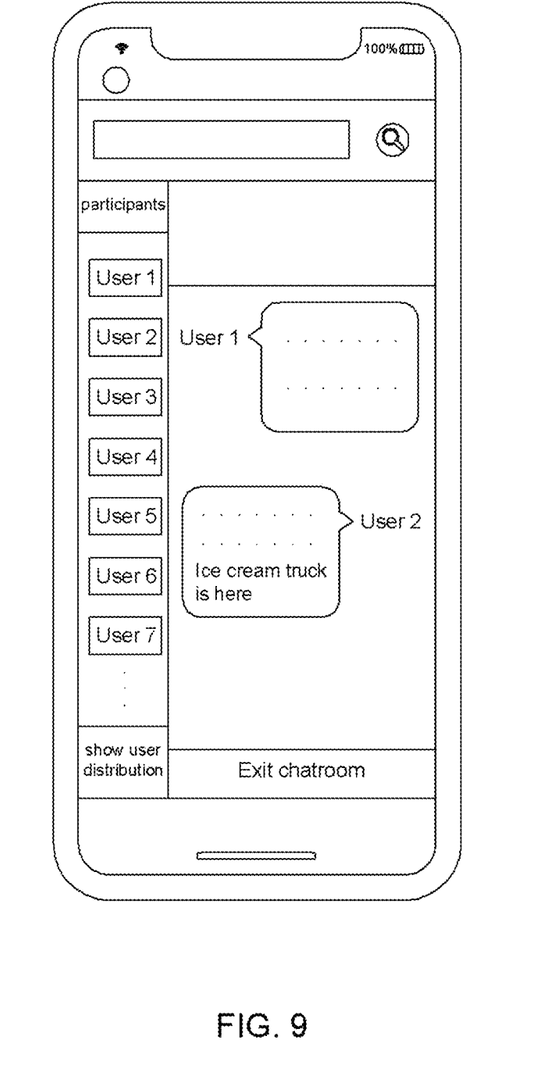
FIG. 9 is shows an example of a chatroom for a neighborhood boundary according to one embodiment of the instant disclosure.

Also, in another embodiment, the generating of the neighborhood boundary may include generating a chatroom for communication between a driver of the driver terminal 40, a user of the user terminal 20, a manager of the manager terminal 30. FIG. 9 shows an example of a chatroom. The chatroom may be a designated chatroom specifically for the neighborhood boundary drawn in the step S3000 or S100. The chatroom may include a plurality of users for the communication between the users located within the neighborhood boundary. Also, the present disclosure is not limited to generating a chatroom, and the system 10 or the application of the present disclosure may also have a text messaging system, short message service (SMS) system, or the like where the driver, manager, or user may send text messages to each other through the SMS system on the application. Also, the driver or manager may utilize the text messaging system, short message service (SMS) system, or the like to send a message to a specific user within a particular neighborhood boundary to communicate with the user for upcoming pre-reserved events, scheduled delivery within the neighborhood boundary, and so forth.

In the chatroom, the manager or the driver may generate a message notifying a scheduled and upcoming delivery service of the delivery service vehicle within the neighborhood boundary. Then, when the users in the chatroom respond to the message from the manager or the driver, memory allocation by the server 10 increases. The server 10 then may analyze the increased memory allocation by the server 10. Here, the users do not necessarily have to send messages responding to the message from the manager or the driver to increase the level of responsiveness of the chatroom that will be reflected as the memory allocation. For example, when the users simply read the message from the manager or the driver or turn on the application for the proximity-based delivery service in response to the manager's message, the server 10 may still allocate memory to reflect the user traffic within the chatroom.

Then, the server 10 may determine whether the memory allocation level for the chatroom exceeds a predetermined threshold. When the server 10 determines that the memory allocation level exceeds the predetermined threshold, the server 10 or the manager terminal 20 may dispatch a delivery service vehicle to the neighborhood boundary of the chatroom.

Figure 10A:
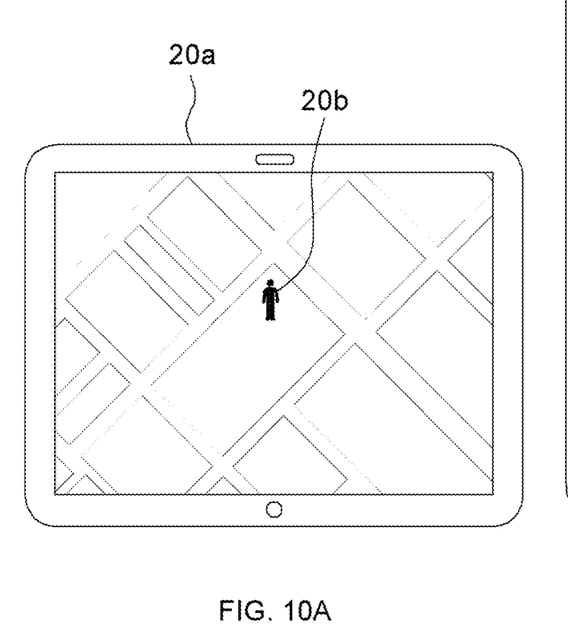
FIGS. 10A and 10B are illustrations of giving a gift by a first user terminal to a second user terminal according to one embodiment of the instant disclosure.

In another embodiment of the present disclosure, the step 4000 may further include outputting, on a first user terminal 20a, a digital map of the neighborhood boundary encompassing the delivery service route and a geolocation of a second user terminal 20b (See FIG. 10A). Then, the first user using the first user terminal 20a may request a stop of the delivery service vehicle at the geolocation 20b of the second user terminal. The first user terminal 20a may pay, in advance, for the delivery service or pay for a purchase of goods or services provided by the delivery service vehicle to be delivered to the second user terminal 20b. When the stop at the geolocation of the second user terminal 20b is received, the server 10 may adjust the delivery service route to pass the geolocation of the second user terminal 20b.

Figure 10B:
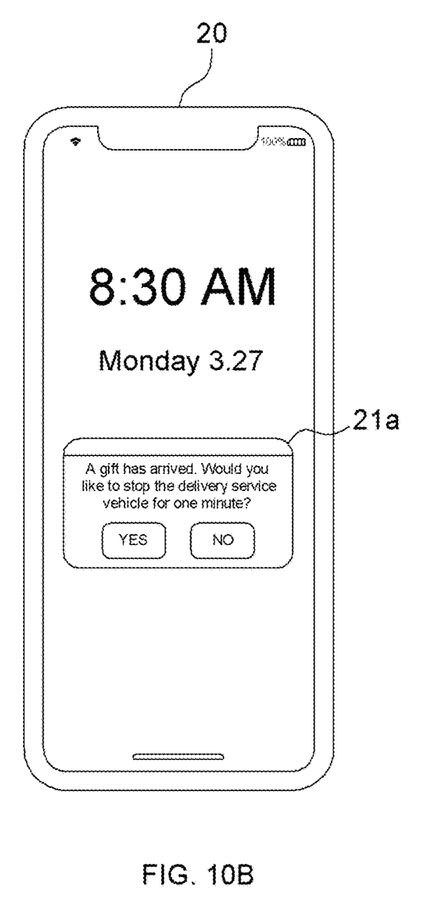

Also, when such request by the first user terminal 20a has been received, the server 10, in the step S5000 or S300 of generating a notification on the user terminal, may also output, on the second user terminal 20b, a notification that a gift has arrived when the geolocation of the second user terminal 20b is within the predetermined distance of the delivery service vehicle of the driver terminal 40. See FIG. 10B.

In all embodiments of the present disclosure, "geolocation" refers to current or last (previous) geolocations of the user terminal 20, manager terminal 30, or driver terminal 40. The geolocations are determined by one or more on-board sensors, such as GPS device, providing GPS information and/or other location indicative information, nearby cell towers, wireless connection points, and the like.

Except where a contrary intent is expressly stated, the terms "comprises," "comprising," "containing," and "having" and the like mean "includes," "including," and the like, and are generally interpreted to be open ended transition terms. The recitation of components, structures, steps, or the like specifically listed following an open-ended transition term in no way limit such claim to the components, structures, steps, or the like specifically listed. The terms "consisting of" or "consists of" are closed transition terms.

Except where a contrary intent is expressly stated, the terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

Except where a contrary intent is expressly stated, terms are used in their singular form for clarity and are intended to include their plural form.

Occurrences of the phrase "in one embodiment," or "in one aspect," herein do not necessarily all refer to the same embodiment or aspect.

While this invention has been described as having designs illustrated by embodiments and examples, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of providing proximity-based delivery service, the method comprising:
generating, by one or more processors, a neighborhood boundary,
wherein the generating the neighborhood boundary includes generating automatically, by the one or more processors, a chatroom for communication between a driver of a delivery service vehicle, a manager of a manager terminal, and at least one user of at least one user terminal located within the neighborhood boundary;
generating, by the one or more processors, a delivery service route within the neighborhood boundary;
generating, by the one or more processors, a notification on a user terminal located within the neighborhood boundary when a geolocation of the delivery service vehicle is within a predetermined distance from a geolocation of the user terminal;
after the generating the neighborhood boundary, generating a message in the chatroom notifying a scheduled delivery service of the delivery service vehicle within the neighborhood boundary;
analyzing, by the one or more processors, memory allocation that reflects user engagement level in response to the message in the chatroom;
determining whether the memory allocation in the chatroom exceeds a predetermined threshold by the one or more processors; and
dispatching the delivery service vehicle to the neighborhood boundary when the memory allocation exceeds the predetermined threshold.

2. The method of claim 1,
wherein the predetermined distance includes a first predetermined distance and a second predetermined distance,
wherein the first predetermined distance is 1 km radius or less and the second predetermined distance is 100 m radius or less.

3. The method of claim 2,
wherein the generating of the notification on the user terminal includes:
generating a proximity notification on the user terminal when the geolocation of the delivery service vehicle comes within the first predetermined distance from the geolocation of the user terminal, the proximity notification enabling the user terminal to request a stop of the delivery service vehicle at the geolocation of the user terminal; or
generating a countdown timer on the user terminal when the geolocation of the delivery service vehicle comes within the second predetermined distance from the geolocation of the user terminal.

4. The method of claim 1, further comprising:
prior to the generating the neighborhood boundary, collecting user information from the at least one user terminal; and
extracting a group of users, based on the user information, according to a plurality of logical extracting rules,
wherein the plurality of logical extracting rules includes extracting, from the user information, information that match information of a predetermined product or service for delivery and extracting the group of users that have the information that match the information of the predetermined product or service.

5. The method of claim 4,
wherein the generating the neighborhood boundary is performed automatically, by the one or more processors, according to a plurality of boundary generating rules, and
wherein the plurality of boundary generating rules includes generating the neighborhood boundary encompassing the group of users, when a memory allocation by the one or more processors for the group of users within a predetermined area exceeds a predetermined threshold.

6. The method of claim 4,
wherein the generating the neighborhood boundary is performed manually by a cursor motion on the manager terminal that outputs a digital map and the group of users extracted according to the plurality of logical extracting rules on the digital map.

7. The method of claim 1,
wherein the delivery service route is generated according to a plurality of route generating rules, and
wherein the plurality of route generating rules include analyzing memory allocation by the one or more processors reflecting user engagement history of the at least one user and generating a delivery service route passing at least one geolocation of the at least one user whose memory allocation by the one or more processors exceeds a predetermined threshold.

8. The method of claim 1,
wherein the delivery service route is generated according to a plurality of route generating rules,
wherein the plurality of route generating rules include analyzing memory allocation by the one or more processors reflecting a current user traffic of the at least one user within the neighborhood boundary and generating a delivery service route passing the at least one user who has the memory allocation that exceeds a predetermined threshold.

9. The method of claim 1,
wherein the generating the delivery service route includes:
outputting, by the one or more processors, on a first user terminal, a digital map of the neighborhood boundary encompassing the delivery service route and a geolocation of a second user terminal,
requesting, by the first user terminal, a stop of the delivery service vehicle at the geolocation of the second user terminal.

10. A system for providing proximity-based delivery service, the system comprising:
one or more processors; and
one or more non-transitory computer-readable media storing instructions executable by the one or more processors, the instructions to perform:
generating, by one or more processors, a neighborhood boundary,
wherein the generating the neighborhood boundary includes generating automatically, by the one or more processors, a chatroom for communication between a driver of a delivery service vehicle, a manager of a manager terminal, and at least one user of at least one user terminal located within the neighborhood boundary;
generating, by the one or more processors, a delivery service route within the neighborhood boundary;
generating, by the one or more processors, a notification on a user terminal located within the neighborhood boundary when a geolocation of the delivery service vehicle is within a predetermined distance from a geolocation of the user terminal;
after the generating the neighborhood boundary, generating a message in the chatroom notifying a scheduled delivery service of the delivery service vehicle within the neighborhood boundary;
analyzing, by the one or more processors, memory allocation that reflects user engagement level in response to the message in the chatroom;
determining whether the memory allocation in the chatroom exceeds a predetermined threshold by the one or more processors; and
dispatching the delivery service vehicle to the neighborhood boundary when the memory allocation exceeds the predetermined threshold.

\* \* \* \* \*